United States Patent
Flickinger et al.

(10) Patent No.: US 11,234,372 B2
(45) Date of Patent: Feb. 1, 2022

(54) DRIVE SYSTEM FOR AN AGRICULTURAL UNLOADER

(71) Applicant: CNH Industrial America LLC, New Holland, PA (US)

(72) Inventors: Wayne T. Flickinger, Oxford, PA (US); Kevin Ward, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 10 days.

(21) Appl. No.: 16/640,628

(22) PCT Filed: Aug. 21, 2018

(86) PCT No.: PCT/US2018/047196
§ 371 (c)(1),
(2) Date: Feb. 20, 2020

(87) PCT Pub. No.: WO2019/040413
PCT Pub. Date: Feb. 28, 2019

(65) Prior Publication Data
US 2020/0170189 A1 Jun. 4, 2020

Related U.S. Application Data

(60) Provisional application No. 62/548,136, filed on Aug. 21, 2017.

(51) Int. Cl.
*A01D 90/14* (2006.01)
*A01D 41/12* (2006.01)
*A01D 90/10* (2006.01)

(52) U.S. Cl.
CPC ......... *A01D 90/14* (2013.01); *A01D 41/1217* (2013.01); *A01D 90/10* (2013.01)

(58) Field of Classification Search
CPC ..... A01D 90/14; A01D 90/10; A01D 41/1217
See application file for complete search history.

(56) References Cited

U.S. PATENT DOCUMENTS 3,224,560 A 12/1965 Jarvis
3,825,138 A * 7/1974 Pool .................. A01D 41/1217
414/505

(Continued)

FOREIGN PATENT DOCUMENTS

GB 1413294 A 11/1975
JP H06030650 A 2/1994

OTHER PUBLICATIONS

International Search Report and Written Opinion for Application No. PCT/US2018/047196 dated Jan. 4, 2019 (13 pages).

*Primary Examiner* — Kaitlin S Joerger
(74) *Attorney, Agent, or Firm* — Peter Zacharias; Patrick Sheldrake

(57) ABSTRACT

An unloading system for an agricultural vehicle includes: a grain tank; at least one cross auger placed within the grain tank; a discharge tube having an inlet in communication with the grain tank and at least one discharge auger placed therein; and a drive system configured to drive the at least one cross auger and the at least one discharge auger. The drive system includes: a main driver; a discharge coupling continuously coupled to the main driver and the at least one discharge auger; and a variable speed coupling continuously coupled to the main driver and coupled to the at least one cross auger.

14 Claims, 4 Drawing Sheets

(56) References Cited

U.S. PATENT DOCUMENTS

| | | | | |
|---|---|---|---|---|
| 3,938,684 | A * | 2/1976 | Quoiffy | A01D 41/1217 414/504 |
| 5,443,352 | A * | 8/1995 | Schuhmacher | A01D 41/1208 198/550.01 |
| 5,518,453 | A * | 5/1996 | Tribbett | A01D 41/1217 414/523 |
| 6,776,569 | B1 | 8/2004 | McMahon et al. | |
| 7,040,980 | B1 * | 5/2006 | Kestel | A01D 41/1217 414/345 |
| 7,452,180 | B2 * | 11/2008 | Taibi | A01D 41/1217 414/812 |
| 7,874,899 | B2 | 1/2011 | Mackin et al. | |
| 8,827,782 | B2 * | 9/2014 | Dise | B65G 33/32 460/114 |
| 9,033,643 | B1 * | 5/2015 | Kile | A01D 41/1217 414/526 |
| 9,049,817 | B2 * | 6/2015 | McCully | A01D 41/1217 |
| 9,137,945 | B2 | 9/2015 | Farley et al. | |
| 9,156,624 | B2 * | 10/2015 | Farley | A01D 41/127 |
| 9,516,811 | B1 * | 12/2016 | Kile | A01D 41/1208 |
| 9,615,509 | B2 * | 4/2017 | Flickinger | A01D 41/1217 |
| 10,214,362 | B2 * | 2/2019 | Farley | B65G 33/14 |
| 10,225,988 | B2 * | 3/2019 | Farley | A01D 61/00 |
| 10,624,269 | B1 * | 4/2020 | Linde | A01F 12/46 |
| 10,779,469 | B2 * | 9/2020 | Flickinger | B65G 67/24 |
| 2006/0104770 | A1 | 5/2006 | Talbi et al. | |
| 2007/0183878 | A1 * | 8/2007 | Talbi | B60P 1/42 414/503 |
| 2009/0290970 | A1 * | 11/2009 | Farley | A01D 41/1217 414/808 |
| 2010/0036569 | A1 * | 2/2010 | Hel | A01B 61/025 701/50 |
| 2012/0237325 | A1 | 9/2012 | Flickinger et al. | |
| 2014/0169932 | A1 * | 6/2014 | Farley | B60P 1/42 414/813 |
| 2015/0156968 | A1 * | 6/2015 | Lauwers | A01F 12/60 56/10.2 R |
| 2016/0174465 | A1 * | 6/2016 | Kohls | A01D 69/03 414/518 |

* cited by examiner

DRIVE SYSTEM FOR AN AGRICULTURAL UNLOADER

FIELD OF THE INVENTION

The present invention pertains to an agricultural vehicle and, more specifically, to a drive system for an unloader of an agricultural vehicle.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, and a discharge system, e.g., one or more discharge augers, on the combine is actuated to transfer the grain into the vehicle.

To unload the grain from the combine, the grain tank may have one or more cross augers placed in the tank which rotate and convey grain material toward the discharge auger(s) to keep the discharge auger(s) fed with grain. In some combines, the rotational power for the cross auger(s) and discharge auger(s) can be provided by a common drive system which couples to a source of rotational power, such as a drive shaft driven by the power plant of the combine. Having a common drive system for the cross auger(s) and discharge auger(s) allows for driving the augers without the need for separate drive systems, which can reduce the space and weight requirements to drive the augers.

One particular problem that is encountered by such drive systems can occur at start-up of the drive system. Since the drive system starts stationary, the initial start-up must overcome inertia to begin rotation of the augers, requiring additional power and which can result in a significant amount of torque on the components during start-up. Further, the unload rate of the augers tends to be directly proportional to the power provided to the augers by the drive system. In some instances there may be excess or reserve power available from the power plant that could be used to increase the unload rate of the augers, but is not provided to the drive system.

What is needed in the art is an unloader system for a combine harvester which can address some of the previously described limitations of known systems.

SUMMARY OF THE INVENTION

In one exemplary embodiment provided in accordance with the present invention, an unloading system for an agricultural vehicle includes a drive system with a main driver, a discharge coupling continuously coupled to the main driver and at least one discharge auger, and a variable speed coupling continuously coupled to the main driver and coupled to at least one cross auger.

In another exemplary embodiment provided in accordance with the present invention, an unloading system for an agricultural vehicle includes: a grain tank; at least one cross auger placed within the grain tank; a discharge tube having an inlet in communication with the grain tank and at least one discharge auger placed therein; and a drive system configured to drive the at least one cross auger and the at least one discharge auger. The drive system includes: a main driver; a discharge coupling continuously coupled to the main driver and the at least one discharge auger; and a variable speed coupling continuously coupled to the main driver and coupled to the at least one cross auger.

In yet another exemplary embodiment provided in accordance with the present invention, an agricultural vehicle includes: a chassis; a power plant carried by the chassis; and an unloading system carried by the chassis. The unloading system includes: a grain tank carried by the chassis; at least one cross auger placed within the grain tank; a discharge tube having an inlet in communication with the grain tank and at least one discharge auger placed therein; and a drive system configured to drive the at least one cross auger and the at least one discharge auger. The drive system includes: a main driver coupled to the power plant; a discharge coupling continuously coupled to the main driver and the at least one discharge auger; and a variable speed coupling continuously coupled to the main driver and coupled to the at least one cross auger.

In yet another exemplary embodiment provided in accordance with the present invention, a method of controlling crop material discharge in an agricultural vehicle including a grain tank, at least one cross auger placed within the grain tank, a discharge tube having an inlet in communication with the grain tank and at least one discharge auger placed therein, and a drive system including a main driver, the method including: rotating the at least one discharge auger via a discharge coupling continuously coupled to the main driver and the at least one discharge auger; rotating the at least one cross auger via a variable speed coupling continuously coupled to the main driver and coupled to the at least one cross auger; and adjusting a drive ratio of the variable speed coupling to change a rotation speed of the at least one cross auger.

One possible advantage of exemplary embodiments provided in accordance with the present invention is the variable speed coupling allows driving the cross auger at a low speed during start-up before changing to a higher speed after start-up.

Another possible advantage of exemplary embodiments provided in accordance with the present invention is a drive ratio of the variable speed coupling can be adjusted to take advantage of excess power that may be provided by the power plant.

Yet another possible advantage of exemplary embodiments provided in accordance with the present invention is a clutch may be incorporated to selectively couple the variable speed coupling and at least one cross auger to allow selective engagement and disengagement of the at least one cross auger from the variable speed coupling.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
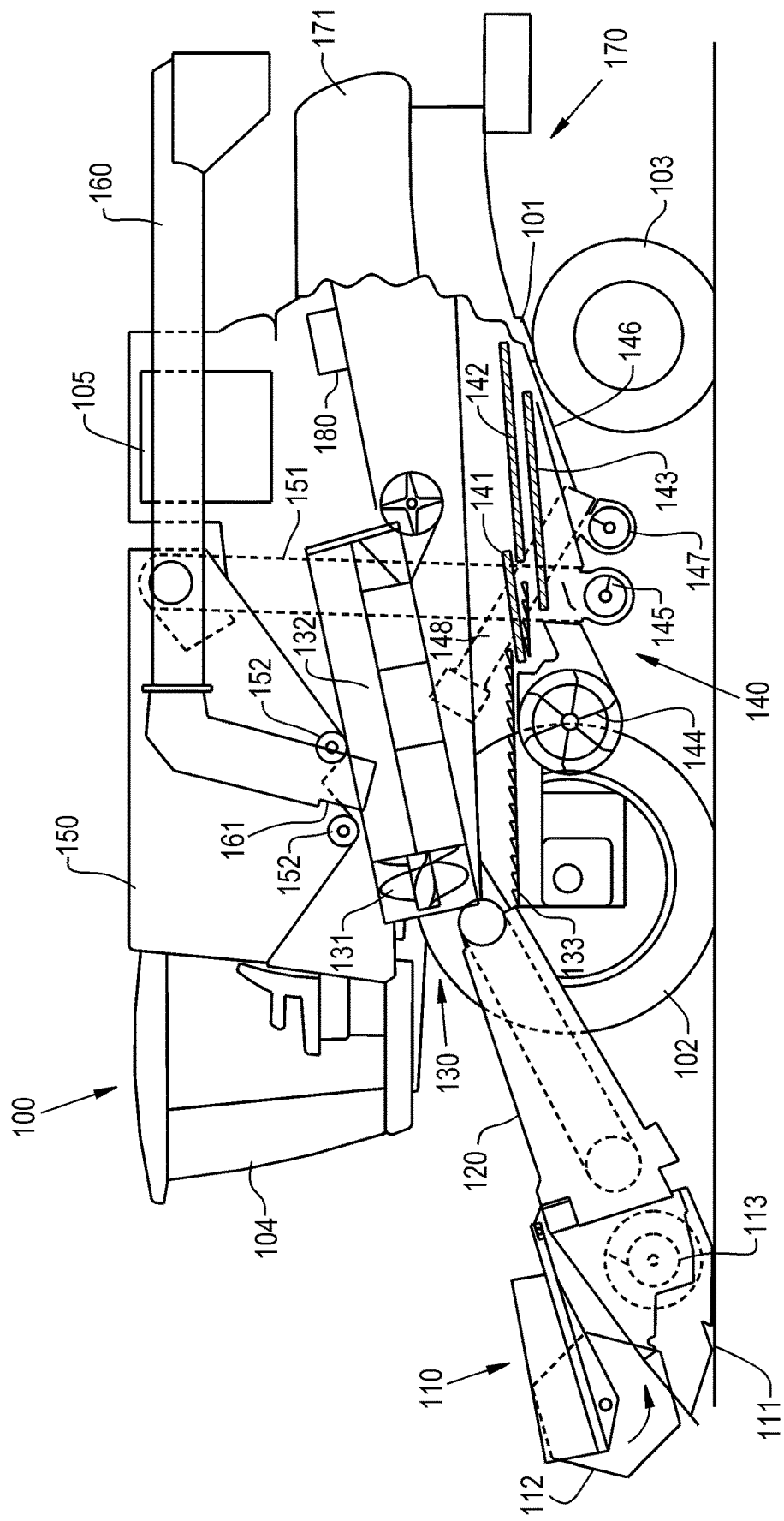
FIG. 1 illustrates a perspective view of an exemplary embodiment of an agricultural vehicle, the agricultural vehicle comprising a power plant and an unloading system, in accordance with an exemplary embodiment of the present invention.

Referring now to the drawings, and more particularly to FIG. 1, there is shown an embodiment of an agricultural vehicle 100 in the form of a combine harvester which generally includes a chassis 101, ground engaging wheels 102 and 103, header 110, feeder housing 120, operator cab 104, threshing and separating system 130, cleaning system 140, grain tank 150, and unloading conveyance 160. Front wheels 102 are larger flotation type wheels, and rear wheels 103 are smaller steerable wheels. Motive force is selectively applied to front wheels 102 through a power plant in the form of a diesel engine 105 and a transmission (not shown). Although combine 100 is shown as including wheels, is also to be understood that combine 100 may include tracks, such as full tracks or half tracks.

Header 110 is mounted to the front of combine 100 and includes a cutter bar 111 for severing crops from a field during forward motion of combine 100. A rotatable reel 112 feeds the crop into header 110, and a double auger 113 feeds the severed crop laterally inwardly from each side toward feeder housing 120. Feeder housing 120 conveys the cut crop to threshing and separating system 130, and is selectively vertically movable using appropriate actuators, such as hydraulic cylinders (not shown).

Threshing and separating system 130 is of the axial-flow type, and generally includes a threshing rotor 131 at least partially enclosed by a rotor cage and rotatable within a corresponding perforated concave 132. The cut crops are threshed and separated by the rotation of rotor 131 within concave 132, and larger elements, such as stalks, leaves and the like are discharged from the rear of combine 100. Smaller elements of crop material including grain and non-grain crop material, including particles lighter than grain, such as chaff, dust and straw, are discharged through perforations of concave 132. Threshing and separating system 130 can also be a different type of system, such as a system with a transverse rotor rather than an axial rotor, etc.

Grain which has been separated by the threshing and separating assembly 130 falls onto a grain pan 133 and is conveyed toward cleaning system 140. Cleaning system 140 may include an optional pre-cleaning sieve 141, an upper sieve 142 (also known as a chaffer sieve or sieve assembly), a lower sieve 143 (also known as a cleaning sieve), and a cleaning fan 144. Grain on sieves 141, 142 and 143 is subjected to a cleaning action by fan 144 which provides an air flow through the sieves to remove chaff and other impurities such as dust from the grain by making this material airborne for discharge from a straw hood 171 of a residue handling system 170 of combine 100. Optionally, the chaff and/or straw can proceed through a chopper 180 to be further processed into even smaller particles before discharge out of the combine 100. It should be appreciated that the "chopper" 180 referenced herein, which may include knives, may also be what is typically referred to as a "beater", which may include flails, or other construction and that the term "chopper" as used herein refers to any construction which can reduce the particle size of entering crop material by various actions including chopping, flailing, etc. Grain pan 133 and pre-cleaning sieve 141 oscillate in a fore-to-aft manner to transport the grain and finer non-grain crop material to the upper surface of upper sieve 142. Upper sieve 142 and lower sieve 143 are vertically arranged relative to each other, and likewise oscillate in a fore-to-aft manner to spread the grain across sieves 142, 143, while permitting the passage of cleaned grain by gravity through the openings of sieves 142, 143.

Clean grain falls to a clean grain auger 145 positioned crosswise below and toward the front of lower sieve 143. Clean grain auger 145 receives clean grain from each sieve 142, 143 and from a bottom pan 146 of cleaning system 140. Clean grain auger 145 conveys the clean grain laterally to a generally vertically arranged grain elevator 151 for transport to grain tank 150. Tailings from cleaning system 140 fall to a tailings auger trough 147. The tailings are transported via tailings auger 147 and return auger 148 to the upstream end of cleaning system 140 for repeated cleaning action. A pair of grain tank augers 152, which may be referred to as "cross augers" and located at the bottom of grain tank 150, convey the clean grain laterally within grain tank 150 to a discharge tube 160 for discharge from combine 100. As can be seen in FIG. 1, the discharge tube 160 has an inlet 161 in communication with the grain tank 150 so crop material within the grain tank 150 can be fed to the discharge tube 160 and be discharged from the combine 100, as will be described further herein.

Figure 2:
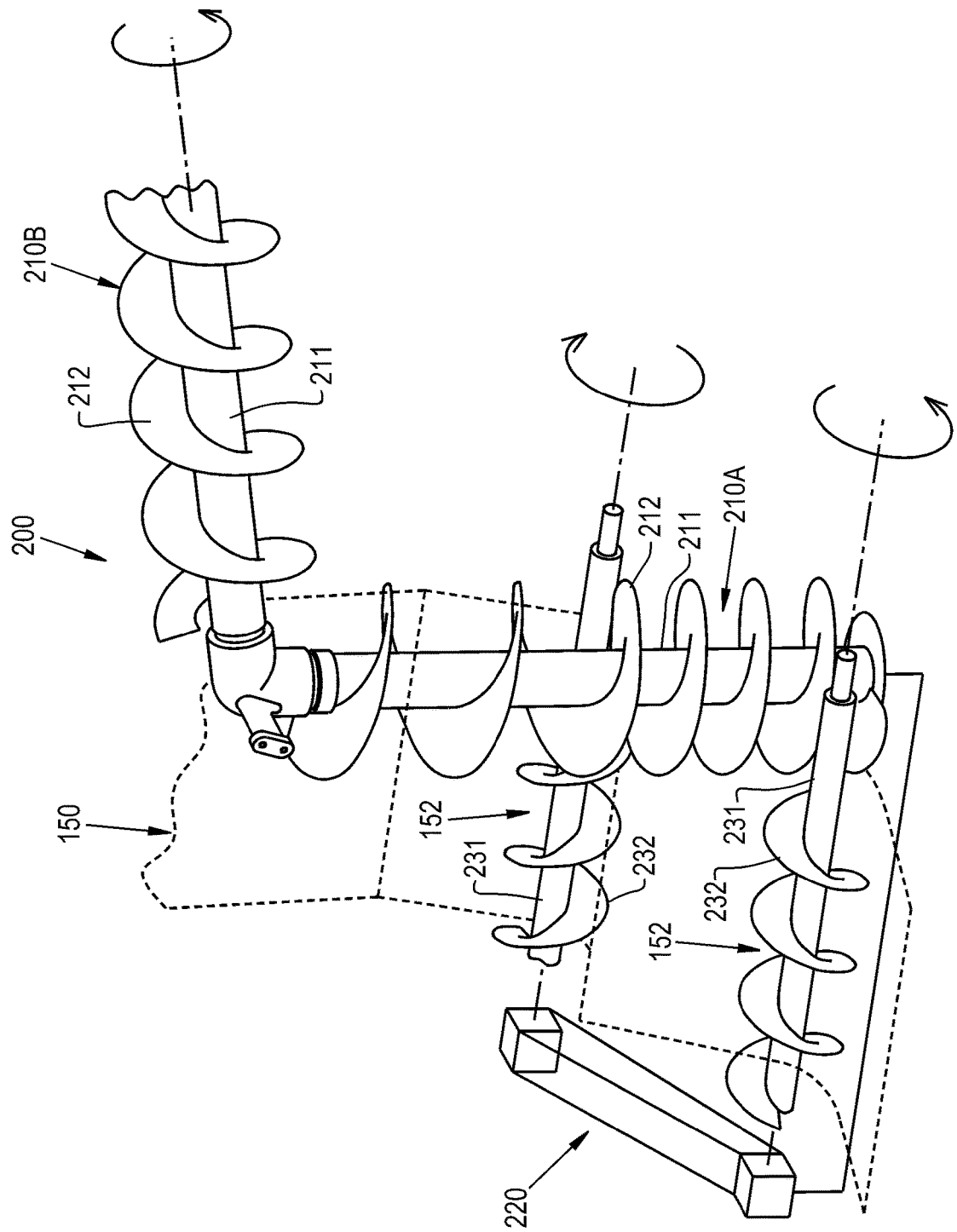
FIG. 2 illustrates a perspective view of the unloading system of the agricultural vehicle of FIG. 1, in accordance with an exemplary embodiment of the present invention.

Referring now to FIG. 2, a perspective view of an exemplary embodiment of an unloading system 200 formed in accordance with the present invention is shown. The unloading system 200 includes the grain tank 150, one or more cross augers, such as grain tank augers 152, placed within the grain tank 150, the discharge tube 160 (shown in FIG. 1) with the inlet 161 (shown in FIG. 1) in communication with the grain tank 150 and including one or more discharge augers 210A, 210B placed therein, and a drive system 220 configured to drive the cross auger(s) 152 and discharge auger(s) 210A, 210B. As can be seen, the unloading system 200 can include a pair of cross augers 152 extending generally parallel to one another and each including an auger shaft 231 with a helical fighting 232 rotatably coupled to the auger shaft 231 so rotation of the auger shaft 231 also rotates the helical flighting 232. The unloading system 200 can also include a pair of discharge augers 210A, 210B, with both of the discharge augers 210A, 210B including a discharge auger shaft 211 with a discharge helical fighting 212 rotatably coupled to the discharge auger shaft 211 so rotation of the discharge auger shaft 211 also rotates the discharge helical flighting 212. As opposed to the cross augers 152, which may be parallel to one another, the discharge augers 210A, 210B can include a first discharge auger 210A which extends from adjacent to the inlet 161 of the discharge tube 160 toward a second discharge auger 210B which extends from an end of the first discharge auger 210A toward an outlet of the discharge tube 160. In one exemplary embodiment, the first discharge auger 210A can extend generally vertical while the second discharge auger 210B can extend generally horizontal, but it should be appreciated that such an orientation of the discharge augers 210A, 210B is optional.

As can be seen, the cross augers 152 can each be coupled to the drive system 220 independently of the other cross auger 152, but it should be appreciated that the cross augers 152 can be driven by a common element which is coupled to the drive system 220. The discharge augers 210A, 210B, on the other hand, may be driven by a single coupling to the drive system 220, as will be described further herein, but it should be appreciated the discharge augers 210A, 210B can each be coupled to the drive system 220 independently of one another, if desired. An exemplary embodiment of how the augers 152, 210A, 210B couple to the drive system 220 is shown in FIG. 3 and described further herein.

Figure 3:
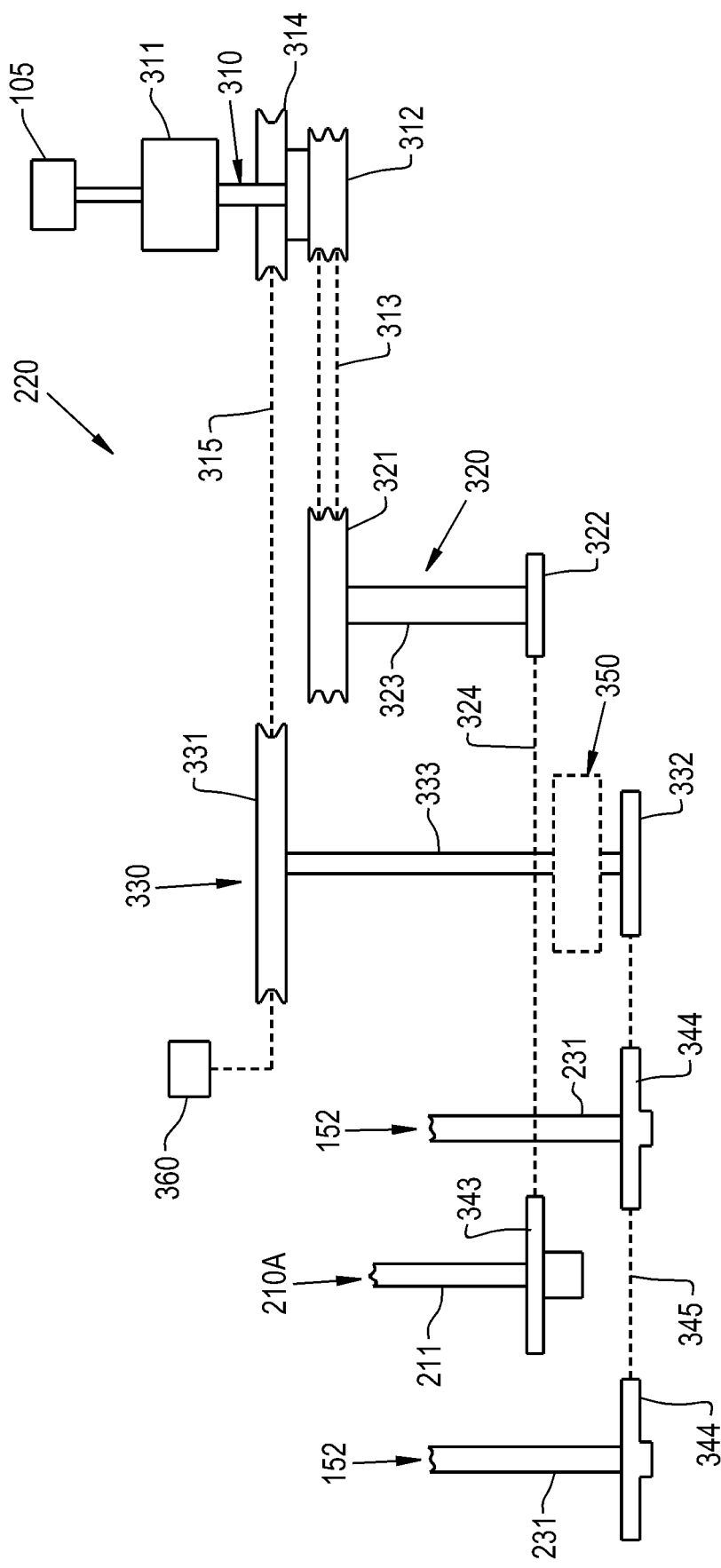
FIG. 3 illustrates a schematic view of a drive system of the unloading system of FIG. 2, in accordance with an exemplary embodiment of the present invention.

Referring now to FIG. 3, an exemplary embodiment of the drive system 220 is shown coupling to the cross augers 152 and one of the discharge augers 210A. The drive system 220 includes a main driver 310, shown as a main drive shaft, which can connect to the power plant 105 in order to provide rotational power to the other components of the drive system 220. Optionally, a main clutch 311, which may be a hydrodynamic clutch in one exemplary embodiment, can selectively couple the main driver 310 to the power plant 105. A discharge coupling 320 is continuously coupled to the main driver 310 and the discharge auger 210A so the discharge auger 210A is continuously coupled to the main driver 310 and a variable speed coupling 330 is continuously coupled to the main driver 310 and coupled to the cross augers 152 so the cross augers 152 can be coupled to the main driver 310, which will be described further herein. To transfer rotational power between the main driver 310 and the couplings 320, 330, the main driver 310 can be rotatably coupled to a main discharge gear 312 which is rotatably coupled to a discharge input gear 321 of the discharge coupling 320 by a main discharge belt 313 and also be rotatably coupled to a main cross gear 314 which is rotatably coupled to a variable input gear 331 of the variable speed coupling 330 by a main cross belt 315. The discharge coupling 320 can be, for example, a fixed speed coupling with a constant drive ratio and include a discharge output gear 322 which is coupled to the discharge input gear 321 by a fixed speed shaft 323 and is also coupled to the discharge auger 210A by a discharge belt 324 wrapped around the discharge output gear 322 and a discharge auger gear 343 which can rotate the discharge auger shaft 211. The variable speed coupling 330, on the other hand, can have variable speeds by virtue of having a variable drive ratio. The variable speed coupling 330 may be, for example, a variator with the variable input gear 331 being rotatably coupled to a variable output gear 332 by a variable speed shaft 333, with the drive ratio of the variator 330 being adjustable as known in the art. It should be appreciated that the previously described "drive ratios" may, in certain embodiments, correspond to gear ratios, as is known in the art. The variable output gear 332 can be rotatably coupled to a cross auger gear 344 of each of the cross augers 152 by one or more cross belts 345 to rotate the cross auger shafts 241. It should be appreciated that the previously described arrangement allowing the main driver 310 to drive the couplings 320 and 330 and respectively coupled augers 152, 210A, 210B represents one exemplary embodiment formed in accordance with the present invention, and the main driver 310 may be coupled to the couplings 320, 330 and augers 152, 210A, 210B in other suitable fashions according to the present invention.

In some exemplary embodiments formed according to the present invention, a clutch 350 can be included in the drive system 220 to selectively couple the variable speed coupling 330 to the cross augers 152. As shown in FIG. 3, the clutch 350 can, for example, be configured to allow selective coupling and uncoupling of the variable output gear 332 to the variable speed shaft 333. The clutch 350 may, for example, be controlled by a pedal (not shown) or other mechanism in the operator cab 104 to allow a user to selectively start or stop rotation, and therefore operation, of the cross augers 152. The clutch 350 can be any type of suitable clutch construction, many of which are known, so further discussion of the construction of the clutch 350 is omitted.

From the foregoing, it should be appreciated that the discharge coupling 320 and the variable speed coupling 330 are continuously coupled to the main driver 310, so rotation of the main driver 310 will also cause rotation of the discharge coupling 320 and variable speed coupling 330. Since the discharge coupling 320 is continuously coupled to at least the discharge auger 210A, the discharge auger 210A coupled to the discharge coupling 320 will also rotate whenever the main driver 310 rotates. In one exemplary embodiment, the variable speed coupling 330 can be continuously coupled to the cross augers 152 so the cross augers 152 will also rotate whenever the main driver 310 rotates, but not necessarily at a fixed speed due to the variable drive ratio of the variable speed coupling 330, the significance of which will be described further herein. In another exemplary embodiment, the variable speed coupling 330 can be selectively engaged and disengaged from the cross augers 152 by the clutch 350, allowing operation of the cross augers 152 to be controlled by the clutch 350.

During start-up of the drive system 220 in one exemplary embodiment, the cross augers 152 and discharge augers 210A, 210B are initially in a non-rotating state and coupled to the main driver 310 by the respective coupling 330 and 320. To overcome inertia and start rotation of the augers 152, 210A, 210B, a significant amount of rotational power is initially required. To assist in reducing the amount of power required, a controller 360 can be coupled to the variable speed coupling 330, which may be a variator, and configured to adjust a drive ratio of the variator 330 by, for example, controlling an actuator (not shown) inside the variator 330 to adjust the drive ratio of the variator 330, as is known in the art. The controller 360 may, for example, be configured to adjust the drive ratio of the variator 330 to a high drive ratio, corresponding to a low speed, when the main clutch 311 is disengaged and/or the main driver 310 first begins to rotate when the main clutch 311 engages the main driver 310. By having the variator 330 in the high drive ratio at start-up, the amount of power required to start rotation of the cross augers 152 can be reduced, reducing the power requirements of the drive system 220 at start-up. Once more power becomes available to the main driver 310, such as after start-up, the controller 360 can be configured to adjust the drive ratio of the variator 330 to a lower drive ratio, corresponding to a higher speed, to allow for a higher conveyance rate of crop material by the cross augers 152.

In another exemplary embodiment of the drive system 220 incorporating the clutch 350, the start-up operation can be adjusted to account for the clutch 350 selectively disengaging the cross augers 152 from the variable speed coupling 330. In such an embodiment, the main clutch 311 and clutch 350 can both initially be disengaged, so the main driver 310 and couplings 320, 330 are not rotating. Upon the main clutch 311 engaging the main driver 310, the clutch 350 can remain disengaged so that while the variable speed coupling (variator) 330 will rotate, due to being continuously coupled to the main driver 310, the cross augers 152 will not rotate due to being disengaged from the variator 330. The discharge auger 210, on the other hand, will rotate due to the continuous coupling to the main driver 310 via the discharge coupling 320. Thus, when the clutch 350 is disengaged, only a small amount of power is consumed by the variator 330 rotating since the cross augers 152 are not being driven. The controller 360 can be configured to adjust the drive ratio of the variator 330 to a high drive ratio, corresponding to a low speed, when the variator 330 is uncoupled from the cross augers 152 by, for example, disengagement of the clutch 350. In this sense, the controller 360 can be configured to place the variator 330 in a "low speed mode" when the cross augers 152 are not being driven, so initial rotation of the cross augers 152 upon engagement of the clutch 350 can be done with the variator 330 at a low speed and thus require less power from the main driver 310. The controller 360 can also be configured to adjust the drive ratio of the variator 330 to a lower drive ratio, corresponding to a higher speed, than the high drive ratio following the variator 330 being coupled to the cross augers 152 via the clutch 350 to provide a higher conveyance rate of material by the cross augers 152. Such a configuration allows the controller 360 to increase the speed of the variator 330 after start-up, when more power is generally available to the main driver 310, for higher conveyance rates by the cross augers 152. The controller 360 can further be configured to detect the clutch 350 is disengaged and adjust the drive ratio of the variator 330 to the low speed mode (high drive ratio) for reengagement of the clutch 350 or the main driver 310 to be disengaged from the power plant 105 via the main clutch 311.

In yet another exemplary embodiment, the controller 360 can be configured to adjust the drive ratio of the variator 330 based on the available power reserve from the power plant 105. One exemplary method of determining the available power reserve is disclosed by U.S. Pat. No. 9,137,945 to Farley et al., which is incorporated in its entirety herein by reference. The controller 360 may, for example, be pre-programmed to correlate the drive ratio of the variator 330 with the available power reserve from the power plant 105; such correlations may be adjusted, as desired, by one skilled in the art. For example, the controller 360 can be configured to determine that when there is additional power available, the controller 360 will signal for the variator 330 to adjust the drive ratio to a higher drive ratio to increase the conveyance rate of the cross augers 152 in order to take advantage of the additional available power. Conversely, the controller 360 can be configured to determine that when there is less power available, the controller 360 will signal for the variator 330 to adjust the drive ratio to a lower drive ratio to lower the conveyance rate of the cross augers 152 so the drive system 220 does not consume an excessive amount of available power.

Figure 4:
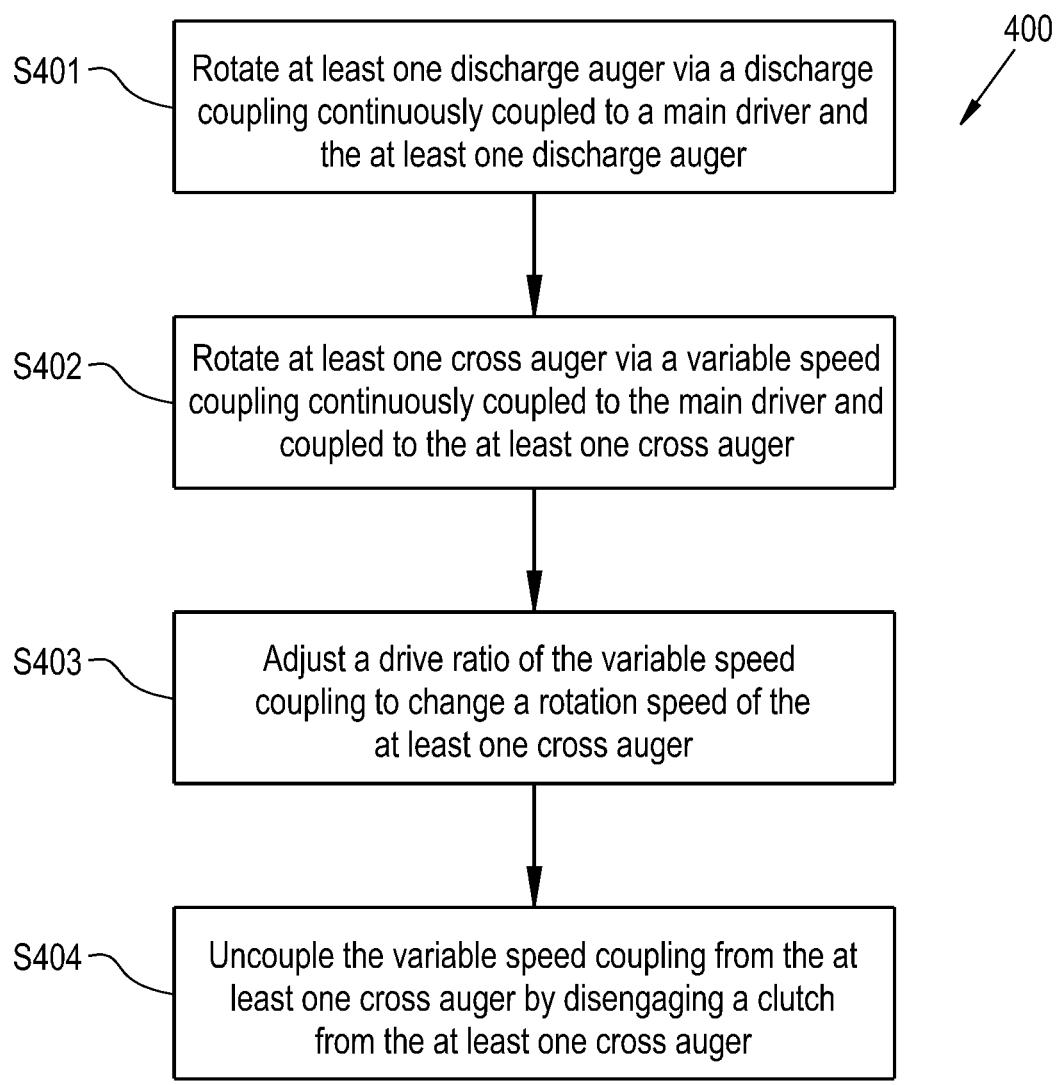
FIG. 4 illustrates a flow chart of a method of controlling crop material discharge from the agricultural vehicle shown in FIG. 1, in accordance with an exemplary embodiment of the present invention.

Referring now to FIG. 4, a flow chart illustrating an exemplary embodiment of a method 400 for controlling crop material discharge in an agricultural vehicle 100 in accordance with the present invention is provided. The method 400 includes rotating S401 at least one discharge auger 210A, 210B via a discharge coupling 320 which is continuously coupled to a main driver 310 and the at least one discharge auger 210A, 210B. The method 400 further includes rotating S402 at least one cross auger 152 via a variable speed coupling 330 which is continuously coupled to the main driver 310 and is also coupled to the at least one cross auger 152. The method 400 further includes adjusting S403 a drive ratio of the variable speed coupling 330, which may be variator, to change a rotation speed of the at least one cross auger 152. The method 400 may be implemented, for example, by a controller 360 which is operationally coupled to the variable speed coupling 330 and, optionally, may detect various operating parameters of the vehicle 100, such as available power, to determine when the drive ratio should be adjusted S403. In some exemplary embodiments, the variable speed coupling 330 may be coupled to the at least one cross auger 152 by a clutch 350 which can be selectively engaged and disengaged. When a clutch 350 is used to couple the variable speed coupling 330 to the at least one cross auger 152, the method 400 can further include uncoupling S404 the variable speed coupling 330 from the at least one cross auger 152 by disengaging the clutch 350 from the at least one cross auger 152. In some exemplary embodiments, the adjusting S403 can include increasing the drive ratio of the variable speed coupling 330 to a higher drive ratio, corresponding to a lower speed; in such an embodiment, the adjusting S403 can occur before and/or after the variable speed coupling 330 is uncoupled S404 from the at least one cross auger 152. In some exemplary embodiments, the adjusting S403 can include decreasing the drive ratio of the variable speed coupling to a lower drive ratio, corresponding to a higher speed; in such an embodiment, the adjusting S403 can occur after the controller 360 determines that there is additional power available for the drive system 220. It should be appreciated that while the previously described method 400 is described as being performed by the previously described agricultural vehicle 100, the exemplary embodiment of a method 400 provided in accordance with the present invention can be performed in other vehicles.

It is to be understood that the steps of the method 400 are performed by a respective controller 160 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controllers 160 described herein, such as the method 400, is implemented in software code or instructions which are tangibly stored on a tangible computer readable medium. Upon loading and executing such software code or instructions by the controller 160, the controller 160 may perform any of the functionality of the controller 160 described herein, including any steps of the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit, by a controller, or by a controller system.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An unloading system for an agricultural vehicle, comprising:
   a grain tank;
   at least one cross auger placed within said grain tank;
   a discharge tube having an inlet in communication with said grain tank and at least one discharge auger placed therein; and
   a drive system configured to drive said at least one cross auger and said at least one discharge auger, said drive system including:
      a main driver;
      a discharge coupling continuously coupled to said main driver and said at least one discharge auger;
      a variable speed coupling continuously coupled to said main driver and coupled to said at least one cross auger;
      a clutch selectively coupling said variable speed coupling to said at least one cross auger; and
      a controller coupled to said variable speed coupling, said controller adjusting a drive ratio of said variable speed coupling to a high drive ratio when said clutch is disengaged, the disengaged clutch uncoupling said variable speed coupling from said at least one cross auger, said high drive ratio corresponding to a low speed of said at least one cross auger when said clutch engages said at least one cross auger with said variable speed coupling.

2. The unloading system of claim 1, wherein said variable speed coupling is a variator coupled to said clutch.

3. The unloading system of claim 1, wherein said controller adjusts the drive ratio of said variable speed coupling to a lower drive ratio than said high drive ratio when power available to said main driver increases following said variable speed coupling being coupled to said at least one cross auger via said clutch, the lower drive ratio corresponding to an increased speed of the at least one cross auger.

4. The unloading system of claim 1, further comprising a main clutch selectively coupled to said main driver.

5. The unloading system of claim 1, wherein said main driver is a main drive shaft.

6. The unloading system of claim 5, wherein said discharge coupling comprises a fixed speed gear coupled to said main drive shaft and a fixed speed shaft coupled to said fixed speed gear and said at least one discharge auger.

7. An agricultural vehicle, comprising:
   a chassis;
   a power plant carried by said chassis; and
   an unloading system carried by said chassis and including:
      a grain tank carried by said chassis;
      at least one cross auger placed within said grain tank;
      a discharge tube having an inlet in communication with said grain tank and at least one discharge auger placed therein; and
      a drive system configured to drive said at least one cross auger and said at least one discharge auger, said drive system including:
         a main driver coupled to said power plant;
         a discharge coupling continuously coupled to said main driver and said at least one discharge auger;
         a variable speed coupling continuously coupled to said main driver and coupled to said at least one cross auger;
         a clutch selectively coupling said variable speed coupling to said at least one cross auger; and
         a controller coupled to said variable speed coupling, said controller adjusting a drive ratio of said variable speed coupling to a high drive ratio when said clutch is disengaged, the disengaged clutch uncoupling said variable speed coupling from said at least one cross auger, said high drive ratio corresponding to a low speed of said at least one cross auger when said clutch engages said at least one cross auger with said variable speed coupling.

8. The agricultural vehicle of claim 7, wherein said variable speed coupling includes a variator coupled to said clutch.

9. The agricultural vehicle of claim 8, wherein said controller adjusts the drive ratio of said variator to a lower drive ratio than said high drive ratio when power available to said main driver increases following said variable speed coupling being coupled to said at least one cross auger via said clutch, the lower drive ratio corresponding to an increased speed of the at least one cross auger.

10. The agricultural vehicle of claim 9, further comprising a main clutch selectively coupling said main driver to said power plant.

11. The agricultural vehicle of claim 7, wherein said main driver is a main drive shaft.

12. The agricultural vehicle of claim 11, wherein said discharge coupling comprises a fixed speed gear coupled to said main drive shaft and a fixed speed shaft coupled to said fixed speed gear and said at least one discharge auger.

13. A method of controlling crop material discharge in an agricultural vehicle including a grain tank, at least one cross auger placed within said grain tank, a discharge tube having an inlet in communication with said grain tank and at least one discharge auger placed therein, and a drive system including a main driver, said method comprising:
   rotating said at least one discharge auger via a discharge coupling continuously coupled to said main driver and said at least one discharge auger;

rotating said at least one cross auger via a variable speed coupling continuously coupled to said main driver and coupled to said at least one cross auger;

uncoupling said variable speed coupling from said at least one cross auger by disengaging a clutch from said at least one cross auger; and adjusting a drive ratio of said variable speed coupling to an increased drive ratio when said at least one cross auger is uncoupled in said uncoupling step, the drive ratio being adjusted to change a rotation speed of said at least one cross auger to a reduced speed when said clutch recouples said variable speed coupling to said at least one cross auger.

14. The method of claim 13, further comprising the steps of:

recoupling said variable speed coupling to said at least one cross auger by engaging said clutch to said at least one cross auger; and adjusting the variable speed coupling to a lower drive ratio than said high drive ratio when power available to said main driver increases following said variable speed coupling being coupled to said at least one cross auger via said clutch in said recoupling step, the lower drive ratio corresponding to an increased speed of the at least one cross auger.

* * * * *